(12) United States Patent
Carus et al.

(10) Patent No.: US 8,036,889 B2
(45) Date of Patent: Oct. 11, 2011

(54) SYSTEMS AND METHODS FOR FILTERING DICTATED AND NON-DICTATED SECTIONS OF DOCUMENTS

(75) Inventors: Alwin B. Carus, Waban, MA (US);
Larissa Lapshina, Shirley, MA (US);
Bernardo Rechea, Belmont, MA (US)

(73) Assignee: Nuance Communications, Inc., Burlington, MA (US)

( * ) Notice: Subject to any disclaimer, the term of this patent is extended or adjusted under 35 U.S.C. 154(b) by 1255 days.

(21) Appl. No.: 11/362,646

(22) Filed: Feb. 27, 2006

(65) Prior Publication Data

US 2007/0203707 A1   Aug. 30, 2007

(51) Int. Cl.
*G10L 15/26* (2006.01)
*G06F 17/21* (2006.01)

(52) U.S. Cl. ......... 704/235; 704/234; 704/244; 715/230

(58) Field of Classification Search .................. 704/234, 704/235, 241, 243, 244, 255; 715/230, 727
See application file for complete search history.

(56) References Cited

U.S. PATENT DOCUMENTS

| | | | | |
|---|---|---|---|---|
| 4,864,502 A * | 9/1989 | Kucera et al. | ...................... | 704/8 |
| 5,649,060 A * | 7/1997 | Ellozy et al. | .................. | 704/278 |
| 5,680,628 A * | 10/1997 | Carus et al. | ........................ | 704/1 |
| 5,890,103 A * | 3/1999 | Carus | ............................... | 704/9 |
| 5,960,447 A * | 9/1999 | Holt et al. | ..................... | 715/201 |
| 6,031,625 A * | 2/2000 | Sherman et al. | ............. | 358/1.18 |
| 6,064,965 A * | 5/2000 | Hanson | ......................... | 704/275 |
| 6,122,614 A * | 9/2000 | Kahn et al. | .................... | 704/235 |
| 6,185,524 B1 * | 2/2001 | Carus et al. | ....................... | 704/9 |
| 6,195,637 B1 * | 2/2001 | Ballard et al. | ................. | 704/235 |
| 6,638,317 B2 * | 10/2003 | Nakao | ........................... | 715/255 |
| 6,704,709 B1 * | 3/2004 | Kahn et al. | .................... | 704/235 |
| 6,708,148 B2 * | 3/2004 | Gschwendtner et al. | ..... | 704/235 |
| 7,366,979 B2 * | 4/2008 | Spielberg et al. | ............. | 715/230 |
| 7,379,946 B2 * | 5/2008 | Carus et al. | ................... | 707/102 |
| 7,516,070 B2 * | 4/2009 | Kahn | ............................. | 704/235 |
| 7,565,282 B2 * | 7/2009 | Carus et al. | ....................... | 704/9 |
| 7,668,718 B2 * | 2/2010 | Kahn et al. | .................... | 704/270 |
| 7,818,308 B2 * | 10/2010 | Carus et al. | ................... | 707/705 |
| 7,937,263 B2 * | 5/2011 | Carrier et al. | ..................... | 704/9 |
| 2002/0152076 A1 * | 10/2002 | Kahn et al. | .................... | 704/270 |
| 2003/0004724 A1 * | 1/2003 | Kahn et al. | .................... | 704/260 |
| 2003/0187642 A1 * | 10/2003 | Ponceleon et al. | ............ | 704/252 |
| 2003/0200093 A1 * | 10/2003 | Lewis et al. | ................... | 704/260 |
| 2003/0225578 A1 * | 12/2003 | Kahn et al. | .................... | 704/243 |
| 2004/0024739 A1 * | 2/2004 | Copperman et al. | ............. | 707/1 |
| 2004/0088162 A1 * | 5/2004 | He et al. | ........................ | 704/235 |
| 2004/0128143 A1 * | 7/2004 | Kahn et al. | .................... | 704/277 |
| 2005/0144184 A1 * | 6/2005 | Carus et al. | ................... | 707/101 |
| 2005/0216264 A1 * | 9/2005 | Attwater et al. | ............. | 704/239 |
| 2005/0222843 A1 * | 10/2005 | Kahn et al. | .................... | 704/235 |
| 2006/0059171 A1 * | 3/2006 | Borthakur et al. | ............ | 707/100 |
| 2006/0149558 A1 * | 7/2006 | Kahn et al. | .................... | 704/278 |

(Continued)

*Primary Examiner* — Martin Lerner

(74) *Attorney, Agent, or Firm* — Wolf, Greenfield & Sacks, P.C.

(57) ABSTRACT

A system and method for filtering documents to determine section boundaries between dictated and non-dictated text. The system and method identifies portions of a text report that correspond to an original dictation and, correspondingly, those portions that are not part of the original dictation. The system and method include comparing tokenized and normalized forms of the original dictation and the final report, determining mismatches between the two forms, and applying machine-learning techniques to identify document headers, footers, page turns, macros, and lists automatically and accurately.

30 Claims, 5 Drawing Sheets

U.S. PATENT DOCUMENTS

| | | | |
|---|---|---|---|
| 2006/0178869 A1* | 8/2006 | Acero et al. | 704/10 |
| 2006/0190249 A1* | 8/2006 | Kahn et al. | 704/235 |
| 2006/0235687 A1* | 10/2006 | Carus et al. | 704/252 |
| 2007/0067168 A1* | 3/2007 | Grobauer et al. | 704/235 |
| 2007/0074102 A1* | 3/2007 | Kraft et al. | 715/512 |
| 2007/0233488 A1* | 10/2007 | Carus et al. | 704/257 |

* cited by examiner

SYSTEMS AND METHODS FOR FILTERING DICTATED AND NON-DICTATED SECTIONS OF DOCUMENTS

BACKGROUND OF THE INVENTION

The present invention relates generally to a system and method for filtering sections of documents for automatic speech recognition processes.

In the process of converting dictated speech files to finished reports, transcriptionists typically transform the original dictation substantially to generate the final report. Transcriptionists may revise the original text stylistically to conform to personal and site standards, to re-order the dictated material, construct lists, invoke text macros to generate tables and other large text sections, and insert document headings. Transcriptionists may also act on specific instructions to correct speech disfluencies such as repeated or fragmentary words.

Additionally, many electronic documentation systems automatically insert document formatting and metadata such as headers, footers, page turns, macros, and default demographic information. Such automatic formatting varies widely from one automatic documentation system to another. Moreover, when using such documentation systems, transcriptionists may actually remove redundant information from the text file, which may have been added by an electronic documentation system.

It has been found that automatically formatted sections are easily and frequently overwritten. Document sections may be improperly filled in or modified, where dictated and transcribed segments may be inserted into macros and tags may be deleted. Consequently, final transcribed text reports often differ substantially from the original recorded dictation.

In many automatic speech recognitions systems however, it is desirable to maintain a close alignment between the dictated audio saved in wave files or other formats and the corresponding transcribed text reports. Such alignment of the wave files and corresponding text is critical for many tasks associated with automatic speech recognition systems. In particular, language model identification (LMID), language model adaptation (LMA), acoustic model adaptation (AMA), automatic error correction, speaker evaluation, report evaluation, and post-processing techniques have been found to benefit from the alignment of the dictated wave files and the corresponding transcribed text. These processes rely on matches between the originally dictated acoustics and text as what was intended, known as "truth." In most automated environments, "truth" is unavailable, so finished reports are used instead to produce "pseudo-truth."

Such mismatches or misalignments between the original recorded dictation and the final text report have been found to degrade automatic speech recognition processes as described above. It has been found for example that non-filtered non-dictated sections in finished documents negatively and significantly effect LMID, most of the LM and AM augmentation processes, and speaker classification. Bad filtering or a lack of filtering is also a serious problem for automatic rewrite techniques. In this connection, it has been found that LMID is often highly inaccurate when headers and footers are not removed from the documents. For example, radiology reports have been identified as belonging to general medicine or mental health domain. In the same example, with headers and footers filtered out these reports have been recognized properly as radiology domain reports. Overall, it has been found that in some cases there is about 5% absolute accuracy degradation due to the erroneous behavior of LMID.

Unfortunately, the current state of technology does not provide a suitable solution for theses issues. For example, current solutions for these issues include manual rewrites of the documents using post-processing. This, of course, increases time of processing for the finished reports as well as the costs associated therewith.

Another sensitive process is LMA, especially for narrow domains like radiology. LMA is a process that includes adjusting word N-gram counts of the existing LM. The goal of LMA is to make the existing language model reflect better the specific speaking style of the particular user or group of users. Traditionally LMA is performed on text of finished reports which is considered to be the best available approximation of the way users dictate. It has been found that leaving the most likely non-dictated sections of reports in the text submitted for LMA leads to the opposite effect, when the LM counts are skewed and end up being further apart from the targeted individual or group specific dictation style.

As a result, finished reports usually differ substantially from the original dictation and techniques to bring them into closer alignment with the original dictation are needed.

Therefore, there exists a need for an automatic document section filtering technique. It is desirable that such a technique is both accurate and automatic. It is also desirable to have such a technique that does not require intervention by transcriptionists or other staff since this is not only time-consuming and expensive, but frequently performed inaccurately and inconsistently.

There also exists a need for a simple and reliable system and method of automatic document section filtering to identify the most likely non-dictated sections of the medical reports in order to filter them out.

There further exists a need to determine reliable heuristics in order to identify non-dictated sections based on alignment of finished reports against recognition output.

There also exists a need for a system and method of automatic document section filtering to filter sufficient amount of data to train classifiers independent of recognition output capable of identifying non-dictated sections such headers, footers, page turns, and macros based on solely text.

There also exists a need for a system and method of automatic document section filtering that uses trained models to classify document sections for documents that are available only in the text form where recognition output is unavailable.

SUMMARY OF THE INVENTION

The present invention includes a system and method for automatic document section filtering. The present invention includes identifying portions of a text report that correspond to an original dictation and, correspondingly, those portions that are not part of the original dictation. The invention includes comparing tokenized and normalized forms of the original dictation and the final report, determining mismatches between the two forms, and applying machine-learning techniques to identify document headers, footers, page turns, macros, and lists automatically and accurately.

In a first aspect, the present invention includes a method for filtering documents including gathering speech recognition output and a first set of corresponding documents, conforming at least one associated document from the first set of corresponding documents to a selected speech recognition format, comparing the speech recognition output and at least one associated document, determining long homogeneous sequences of misaligned tokens from the speech recognition output and at least one associated document, detecting boundaries between dictated and non-dictated sections in at least one associated document and annotating at least one associated document with the boundaries.

In some embodiments the conforming step may include pre-processing at least one of the associated documents and the comparing step may include performing label smoothing on the recognition output and at least one associated document. The label smoothing may be performed using a sliding average with a fixed window size. In some embodiments, in particular for medical documents, the window size was determined to be about 3.

In some embodiments determining long homogeneous sequences of misaligned tokens may include the step of detecting formatting anchors and identifying end points of the detected long homogeneous sequences of misaligned tokens.

Some embodiments include outputting the dictated sections to at least one automatic speech recognition process such as language model identification, language model adaptation, acoustic model adaptation, automatic error correction, and speaker evaluation.

Some embodiments include creating classification models in order to distinguish between dictated and non-dictated sections of text in at least one associated document. Based on the classification models, some embodiments include categorizing text of a second set of documents to identify dictated and non-dictated sections of text within at least one of the second set of documents. Additional embodiments may include outputting dictated sections of at least one document from the second set of documents to an automatic speech recognition process. The first set of documents may not equal the second set of documents.

In a second aspect, the present invention includes a method for filtering documents, including gathering a set of documents having dictated and non-dictated section boundaries, featurizing text in at least one document from the set of documents, differentiating dictated and non-dictated sections of text in at least one document, categorizing text of a second set of documents to identify dictated and non-dictated sections of text within at least one of the second set of documents and outputting dictated sections of at least one document from the second set of documents to an automatic speech recognition process.

The gathering step may include pre-processing text in the documents. Some embodiments may include interpreting featurization rules and generating featurized data.

In some embodiments the differentiating step includes creating classification models in order to distinguish between dictated and non-dictated sections of text in at least one document where the categorizing may be performed based on the classification models.

In a third aspect, the present invention includes a system for filtering sections of electronic documents to determine dictated and non-dictated text in the documents having a central processing unit with computer code operatively associated with the central processing unit. In some embodiments the computer code may include a first set of instructions configured to gather speech recognition output and a first set of documents corresponding to the speech recognition output, a second set of instructions configured to conform at least one associated document from the first set of corresponding documents to a selected speech recognition format, a third set of instructions configured to compare the speech recognition output and at least one associated document, a fourth set of instructions configured to determine long homogeneous sequences of misaligned tokens from the speech recognition output and at least one associated document, a fifth set of instructions configured to detect boundaries between dictated and non-dictated sections in at least one associated document and a sixth set of instructions configured to annotate at least one associated document with the boundaries.

In some embodiments the second set of instructions may include pre-processing of at least one of the associated documents. The third set of instructions may include performing label smoothing on the recognition output and at least one associated document where the label smoothing is performed using a sliding average. In some embodiments the label smoothing is performed using a window size of about 3.

In some embodiments the fourth set of instructions includes detecting formatting anchors and the fifth set of instructions may include identifying end points of the detected long homogeneous sequences of misaligned tokens.

In some embodiments the computer code includes a seventh set of instructions configured to output the dictated sections to at least one automatic speech recognition process. At least one automatic speech recognition process may include language model identification, language model adaptation, acoustic model adaptation, smart rewrite and speaker evaluation.

Some embodiments include an eighth set of instructions configured to create classification models in order to distinguish between dictated and non-dictated sections of text in at least one associated document. There may also be a ninth set of instructions configured to, based on the classification models, categorize text of a second set of documents to identify dictated and non-dictated sections of text within at least one of the second set of documents.

Some embodiments of the present invention may include the computer code with a tenth set of instructions configured to output dictated sections of at least one document from the second set of documents to an automatic speech recognition process.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE PREFERRED EMBODIMENTS

Figure 1:
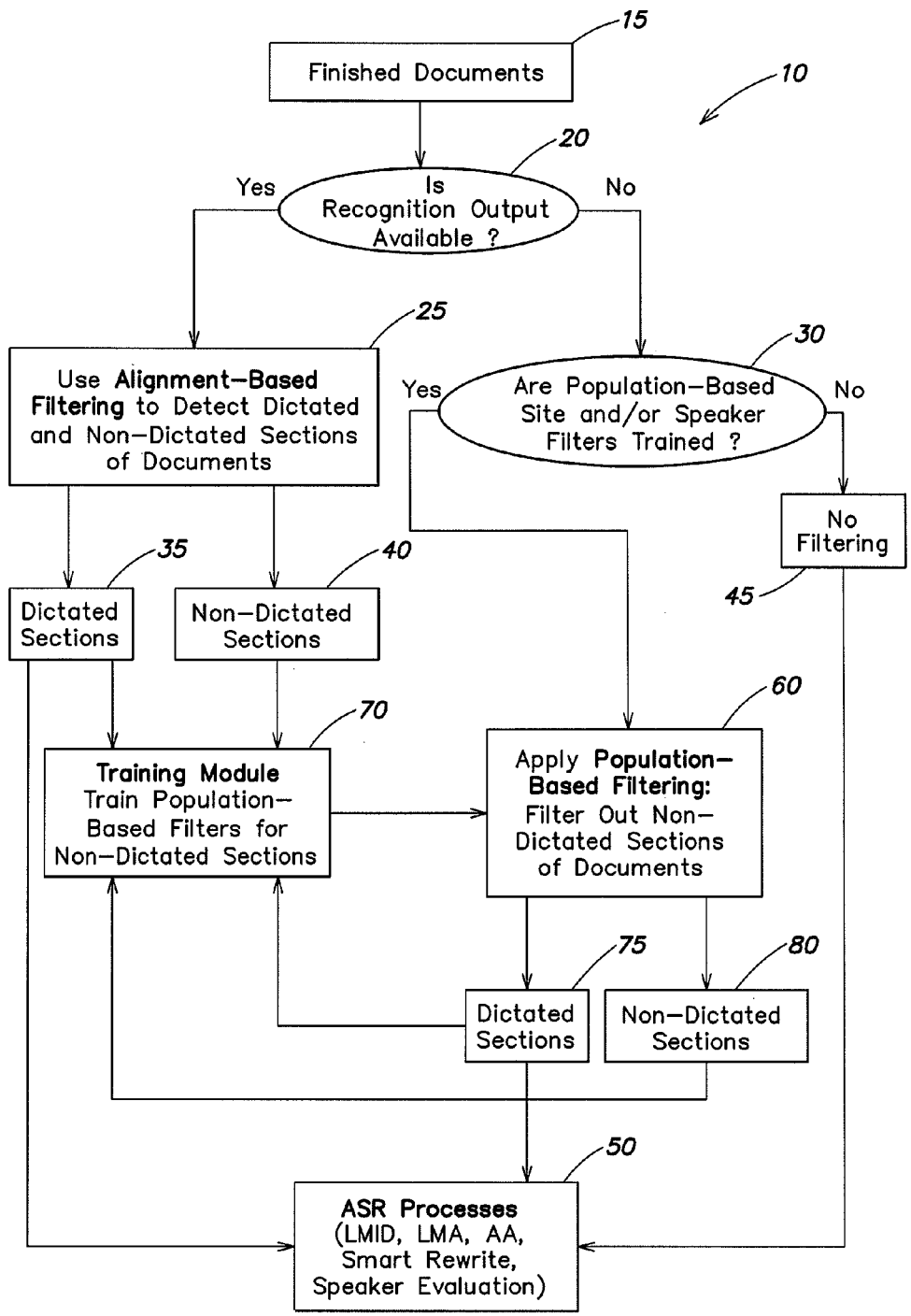
FIG. 1 is a diagram of a document filtering system according to one embodiment of the invention.

The present disclosure will now be described more fully with reference to the Figures in which at least one embodiment of the present invention is shown. The subject matter of this disclosure may, however, be embodied in many different forms and should not be construed as being limited to the embodiments set forth herein.

In the various embodiments described herein, each such embodiment may be implemented through the use of a central processing unit having a computer code mechanism structured and arranged to carry out the various steps and functions corresponding to the elements in the various diagrams.

In one embodiment the invention includes identifying and selectively processing non-dictated sections of text reports. Such selective processing may include either removing or ignoring certain sections of the reports. The final text of reports may contain substantial document formatting and metadata generated in the post-dictation, transcription phase of document preparation. Identifying those portions of the final report that match the original dictation can substantially improve the accuracy of language model identification, language model adaptation, acoustic model adaptation, automatic error correction model learning, speaker evaluation, report evaluation, and post-processing.

The invention also includes comparing tokenized and normalized versions of the original dictation and its corresponding finished report using a variant of the Levenshtein edit distance algorithm. Mismatches between the two forms are identified and once a sufficiently large set of dictation-report pairs and their associated mismatches have been collected (on the order of the same number as required for language model adaptation), these data are used to teach classifiers to identify headers, footers, macros, and lists. Still other embodiments may employ the IGTree and IB algorithms of the TiMBL machine-learning classifier system to generate accurate and compact classifiers.

The resulting information about the boundaries of headers, footers, page turns, macros, and lists may be then used to construct appropriate input data for different processes. For example, headers, footers, and page turns are removed for all processes. For LMID nothing further may be removed. For LMA, AMA, automatic error correction, and speaker and report evaluation, macros may be removed. It has been found that post-processing benefits from improvements in identifying lists as described herein.

In one embodiment of the present invention, an alignment-based approach is implemented to correct misalignments, which may be based on comparison of tokenized finished reports and recognition output. This approach allows identification of headers, footers, and text body of the report with a great deal of accuracy where headers, footers, and text body detected with alignment-based method can be used for training header, footer, and text body models that provide reliable classification of the sections based on text only. Proper implementation of this approach has demonstrated section classification accuracy to about 97% or even higher for site-specific and speaker-specific models. Accuracy of site-specific models proves to be comparable or sometimes better than speaker-specific models for small amounts of training data.

In another embodiment of the present invention, a best performing classification method is implemented using line-by-line classification with two initial tokens of each line as features used with the context window size 2-2. Such a context window may include features of two previous lines, two following lines and a target line combined.

The present invention may be implemented with relatively few site reports including text and wave file pairs, while maintaining sufficient standards to train reliable filters. Such filters may then be implemented to process text without recognition output. Speaker specific filters with about 93% accuracy may be trained for about between 10-20 speaker wave/text pairs.

In another embodiment of the present invention, there includes a method to determine reliable heuristics to identify non-dictated sections based on alignment of finished reports against recognition output. In some embodiments there is an assumption that non-dictated sections of the report will be labeled by the aligner as misalignments (insertions or deletions). Another assumption may include that normally sections have certain formatting and lexical features that can be utilized by the present invention. Such formatting and lexical features may include sections separated by paragraph or a new line, headers that are normally expected at the beginning of the report, footers at the end, and page turns that may have a key word such as "page".

Using alignment and heuristics, one method may include filtering a sufficient amount of data to train classifiers independent of recognition output capable of identifying non-dictated sections such as headers, footers, page turns, and macros based on text only. For documents that are available only in the text form, where recognition output is unavailable, the invention may use trained models to classify document sections.

No form of annotation, manual or automatic, is 100% accurate. As such, and since the terms "header" and "footer" are meant in a broad sense as sections at the beginning and the end of the document that are normally not dictated or unlikely to be dictated, it can be difficult to make a decision about segment boundaries based on some strict textual or formatting rules. Moreover, speakers may not always be consistent. Some speakers tend to never dictate meta-data that usually belongs to headers and footers. Other speakers may dictate some of the meta-data including signatures, distribution ("cc") lists, topic of the report, demographic information, and medical record of the patient. As a result, the medical report data may demonstrate significant inter- and intra-speaker variability.

In addition, the present invention may be applied across clinic sites with a broad range of medical domains and document worktypes.

In some embodiments implementing an alignment-based filtering method for the detection of headers and footers may include simple text preprocessing, for example the insertion of artificial whitespace tokens such as "DUMMYPARAGRAPH" and "DUMMYNEWLINE". In order to preserve formatting information in the document, tokenization, simple "anti-post-processing" normalization, alignment, and alignment-based filtering may be implemented thereafter.

The step of alignment-based filtering may include labeling, based on an alignment, where each token of the finished report is evaluated and labeled as "Correct" ("C") or "Incorrect" ("I") and smoothing having a sliding average and window size of 3. A sequence of three labels may be evaluated as follows;

$L_{i-1}, L_i, L_{i+1}$

Where the Label $L_i$ is re-evaluated as "Correct" if the number of "Correct" tokens within the sliding window is greater than the number of "Incorrect" tokens, and as "Incorrect" otherwise. The detection of misalignments at the beginning and the end of the document of 5 tokens and longer may be candidates for headers and footers.

Use of anchoring tokens may include where the header/footer boundary is shifted to the last/first "anchor" token of a misalignment group. Such anchors may include whitespace tokens such as the following: "\Paragraph", "\New-Line", "DUMMYPARAGRAPH", "DUMMYNEWLINE".

For text-only-based classifiers the following features and combinations of features may be implemented as follows:
1. Line length (in tokens)
2. Colon rate (Number of ":\colon" tokens divided by number of tokens in line);

3. Name rate (Number of "NAME" tokens divided by number of tokens in line);

4. Digit rate (Number of "DIGIT" tokens divided by number of tokens in line);

5. Lexical features (N initial tokens of each line);

6. Ascending and descending line offset (position of the line in the document); and 7. Line context.

In preferred embodiments, the present invention may be implemented by classifying reports line by line. In some embodiments line length, colon rate, name rate, and digit rate may be evaluated together as such parameters may not be good enough alone to be reliable header and footer predictors.

In still other embodiments line length, colon rate, name rate, digit rate, and line offset may be evaluated where the line offset may improve model performance when line features are used without context. Models based on lexical features with context may outperform models built with line length, colon rate, name rate, digit rate, and line offset.

Initial tokens of each line may be implemented as features where pure lexical features may perform better for certain site specific domains. In other sites, accuracy results may be slightly higher (about 0.4%) when lexical features are combined with other line characteristics (line length, name rate, digit rate, and colon rate).

Context features, such as features of an adjacent line combined with the features of the target line of the reports, may also be implemented as classification predictors. In some embodiments different context window sizes may be implemented as follows:

1-1 (target line feature vector plus features of one line before and one lie after);

2-2 (target line feature vector plus features of two lines before and two lines after);

3-3 (target line feature vector plus features of three lines before and three lines after); and 4-4 (target line feature vector plus features of four lines before and four lines after).

In one of the embodiments the optimal value for the context window size was found to be 2-2, where the target line feature vector includes features of two lines before and two lines after.

Normalization of common data types may reduce lexical variability of documents revealing their underlying structure. The lines from two different but similar reports may look different and as a consequence might be represented by different classification feature values both before normalization and after.

However, in order to determine whether normalization is helpful for the task, two sets of normalization rules may be applied to the original training and test data. Classification accuracy on the normalized data may also be compared to the numbers obtained on the original non-normalized data. Normalization may be especially effective and significantly improve performance in cases of the limited feature sets such as the number of tokens, the name rate, and the digit rate.

In addition, IGTree and k-nearest neighbor machine learning algorithms may be implemented for various document conditions. In certain cases for various feature sets, context size, normalization levels, implementing the k-nearest neighbor algorithm (where k=2) may provide unexpected results over implementing the IGTree algorithm by slightly more than 1%.

In implementing the various embodiments of the present invention examples have been provided in the medical domain. However, it will be understood by those skilled in the art that the present invention may also be implemented in other domains, such as the legal field, engineering, and business domains as well. It will also be understood by those skilled in the art that the invention disclosed herein and embodied in the attached drawings may be implemented with physical documents and systems as well as with electronic documents and systems.

Specifically referring now to FIG. 1, there is shown a diagram representative of the invention according to one embodiment of the invention. The filtering system is shown generally as reference numeral 10. Finished reports 15 are input to system 10 and decision 20 determines whether corresponding recognition output is available. When finished reports and recognition output are available, alignment-based filtering 25 is implemented for detection of dictated and non-dictated sections of the finished reports. Alignment-based filtering 25 is discussed in further detail below in connection with FIG. 2.

Dictated sections of the reports 35 and non-dictated sections of the reports 40 are output from the alignment base filtering process 25 and loaded into training module 70, which trains the population-based filters for non-dictated sections of the report. Training module 70 is described in further detail below in connection with FIG. 4.

Dictated sections 35 are loaded into ASR processes 50 which can include LMID, LMA, AMA, automatic error correction, and speaker evaluation. If there does not exist any recognition output system 10 determines whether population-based filters have been trained 30. If there are no filters and nothing is trained, no filtering is required 45. The finished reports are used without any processing or filtering and the reports are input directly to ASR processes 50.

If population-based site and/or speakers filters are trained, population-based filtering 60 may be applied. Population-based filtering 60 is discussed in further detail below in connection with FIG. 3. Dictated sections of the report 75 are filtered and forwarded to training module 70 and to ASR processes 50. In addition, non-dictated sections of the reports 80 are filtered and forwarded to training module 70.

Figure 2:
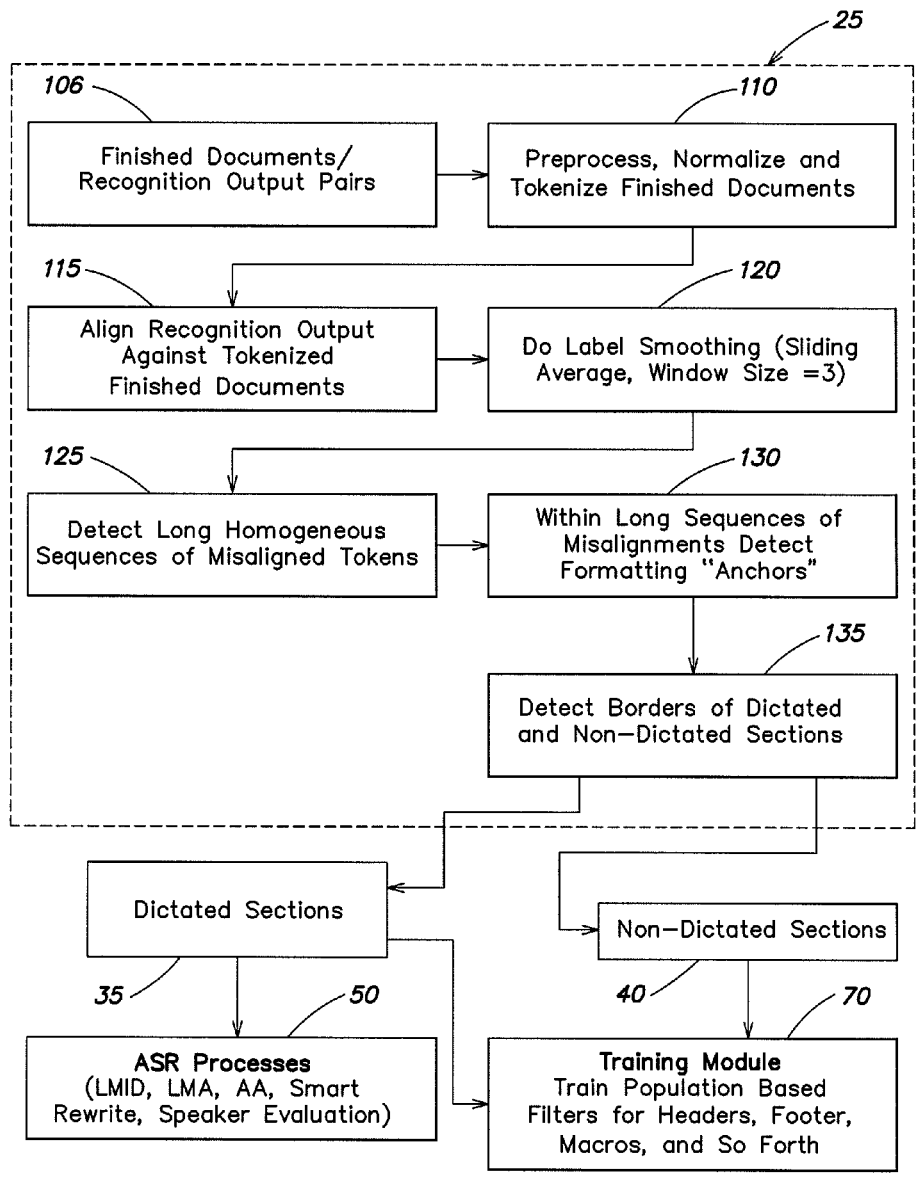
FIG. 2 is a diagram of alignment-based filtering system according one embodiment of the invention.

Referring now to FIG. 2, there is shown a diagram representative of alignment-based filtering according to an embodiment of the invention. Alignment-based filtering is represented by box 25 and may include multiple elements and/or processes therein. Finished reports and recognition output pairs 106 are preprocessed and memorized and finished reports are tokenized 110 as well. Alignment of the recognition output against the tokenized finished documents is then conducted 115. A label smoothing process is performed 120 using sliding average techniques and where for one embodiment the window size is about three (3). In alternative embodiments the window size may be larger than three and other smoothing or averaging techniques may be used.

Detection of all the long homogeneous sequences of misaligned tokens 125 is then performed. Within the long homogeneous sequences of misalignment, formatting anchors are detected 130. Formatting anchors may include variants of tokens indicating the start of new paragraph ("paragraph", "new paragraph", "next paragraph") or new line ("new line", "next line").

Boundaries between dictated and non-dictated sections of the report are detected 135. In some embodiments the boundaries are detected based on misalignment sequences and anchor tokens. As a result the dictated sections are determined and outputted 35 and inputted into ASR processes 50 as well as the training module 70. Non-dictated sections of the report are output 40 to the training module 70.

Figure 3:
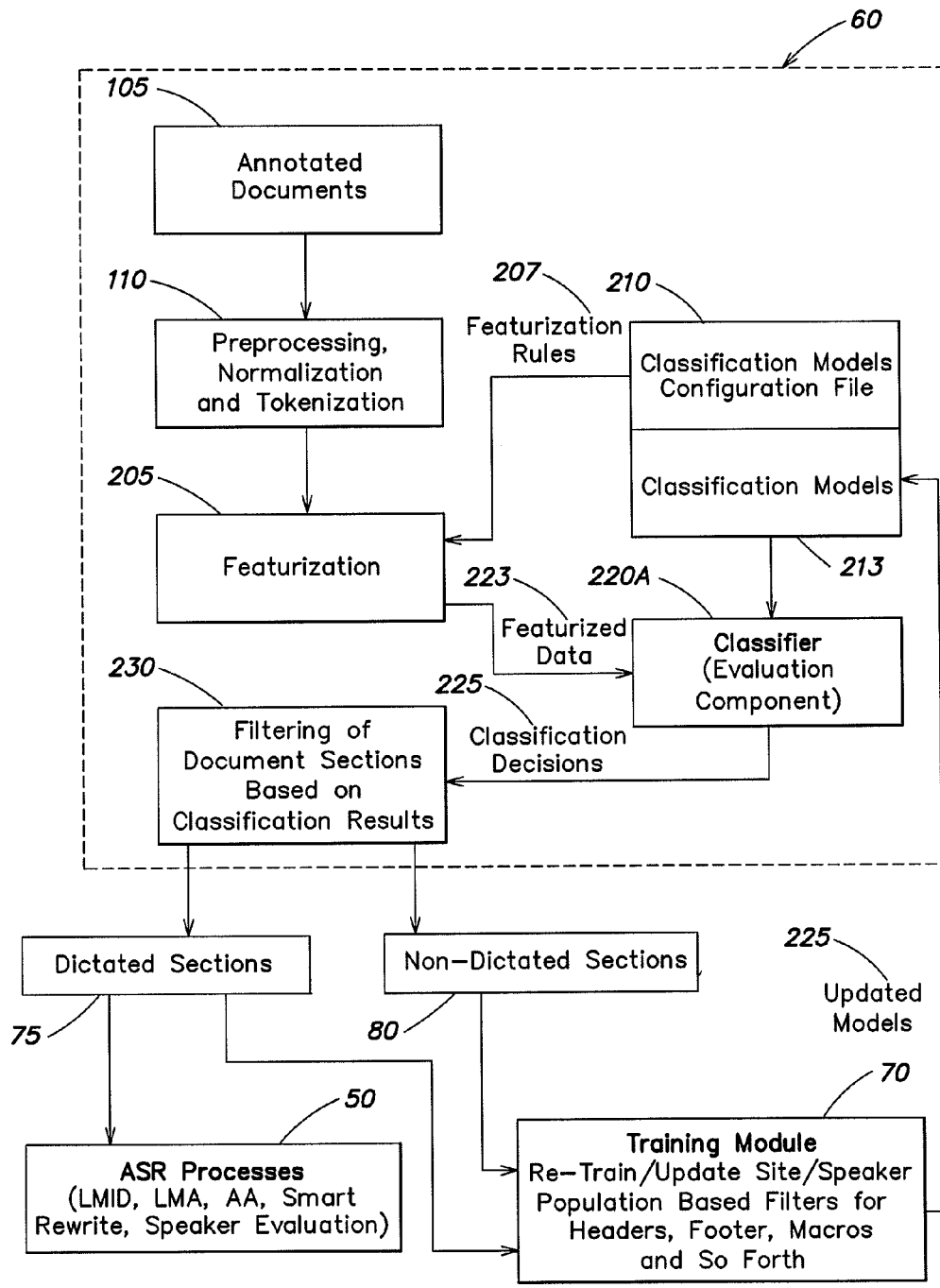
FIG. 3 is a diagram of population-based filtering system according to one embodiment of the invention.

Referring now to FIG. 3, there is shown a diagram representative of population-based filtering according to one embodiment of the invention. Population-based filtering 60 is represented by box 60 and may include multiple elements and/or processes therein. Such elements may include annotated documents 105 which may be preprocessed, normalized and tokenized 110.

A pool of candidate headers, footers, and other non-dictated sections can be identified by annotating a collection of documents. These data can in turn be used to induce (construct) a classifier. This approach suffers from several difficulties: (a) annotation is time-consuming and expensive; and (b) non-dictated sections are user-specific as some speakers tend to dictate signatures, cc lists, titles or topics of the reports and while others do not. Speaker habits cannot be identified without comparing text of the reports to the voice recordings.

In addition, featurization 205 may be performed with featurization rules 207 being input from classification model configuration file 210.

It will be understood by those skilled in the art that featurization is a process of transforming, converting, or re-representing input data in a form which is appropriate and amenable for computational processes, such as, for example, machine learning. In this example, the system may identify a set of attributes, characteristics, or features. These features may be used to characterize a particular training example or examples when using multiple or larger sets of data. As a result, when training for example with the term 'this', the features sought after might be the individual characters of the word: the fact that it begins with a consonant and ends with a consonant, that it is a function word, that the term is short, that the term is uncapitalized, that the term contains a sibilant, that it is a monosyllabic word, and so forth. These are attributes or characteristics of the word 'this', which are not necessarily apparent from the raw data itself, although such data might contain raw data elements in some form, but are in a representation of the information in a systematic, orderly, and input-relevant format that can be processed, analyzed and used both for generation of training data sets and evaluation of later instances using exactly the same featurization process.

Featurization rules 207 include a set of classification attributes which are expected to be used for document section classification with prescribed values of some configurable attribute parameters. Featurization rules can include instructions on how a classification target, which may be a line of a specific report, can be converted into a set of attributes matching the appropriate classification model. The present invention is beneficial in that exceptional results in document section classification may be achieved by classifying line-by-line where each line of the document is being the classification target. The best classification features proved to be several initial lexemes of each target line and several initial lexemes of the preceding and following lines. In one embodiment, featurization rules may use 3 initial lexemes of the target line, 2 initial lexemes of the 2 previous lines and 2 initial lexemes of 3 following lines.

Continuing with FIG. 3, juxtaposed with element 210, there are classification models 213 which output to a classifier 220A, where classifier 220A incorporates an evaluation component. Featurized data 223 from the featurization process 205 may be loaded to the classifier 220A. Classification decisions 225 are then forwarded such that filtering of the documents 230 may be accomplished.

The dictated sections 75 are output to ASR processes 50 and to training module 70. Non-dictated sections 80 are also output to training module 70. Additionally, updated models 225 may be loaded from training module into classification models 213.

Figure 4:
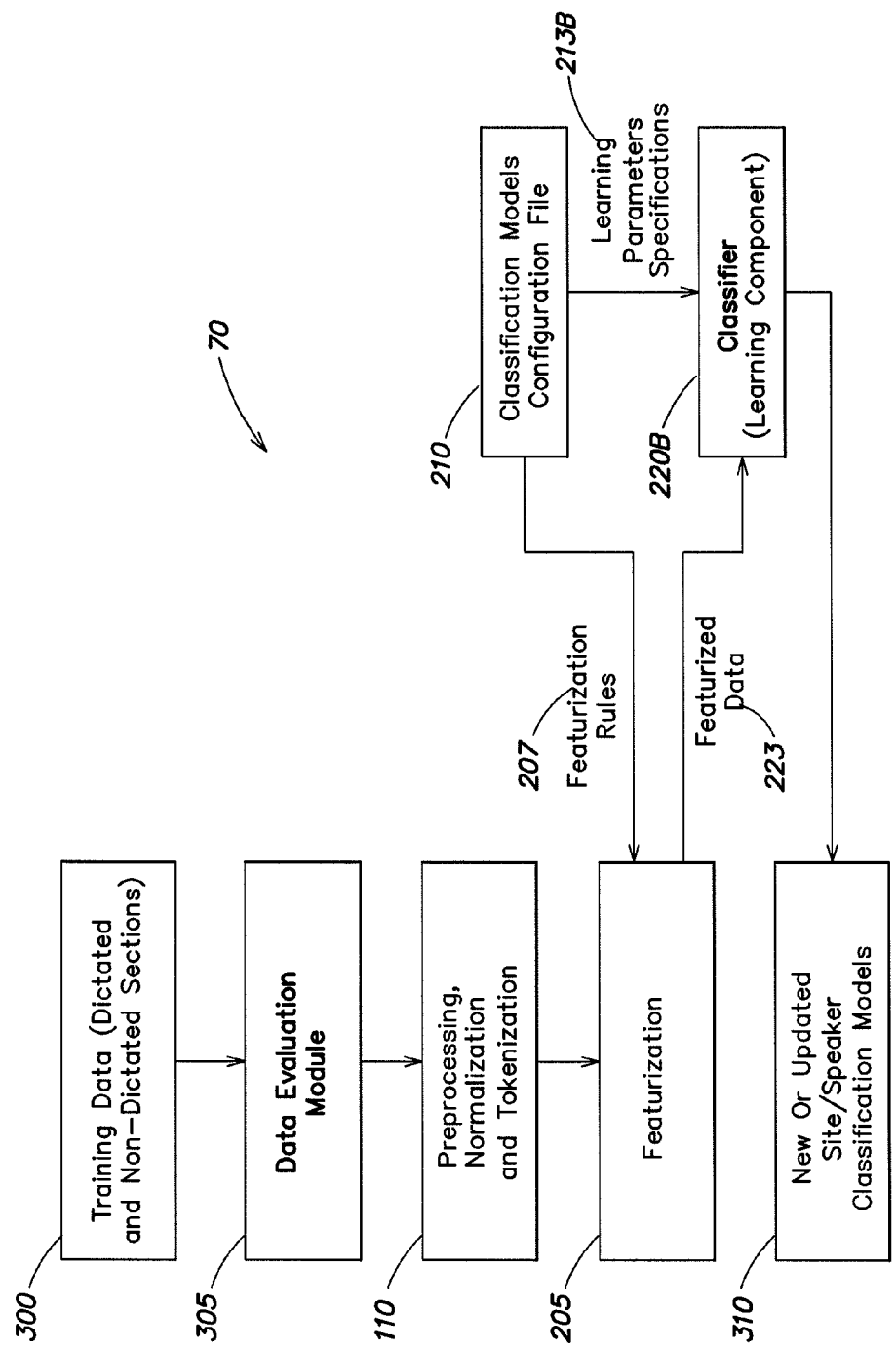
FIG. 4 is a diagram of a training module process system according to one embodiment of the invention.

Referring now to FIG. 4, there is shown a diagram representative of training module 70 according one embodiment of the invention. Training module 70 includes training data 300 (which may include both dictated and non-dictated sections) that is input into data evaluation module 305. Data evaluation module 305 is discussed in further detail in connection with FIG. 5.

Training data 300 is then selectively preprocessed, normalized and tokenized 110 before the featurization process 205 is performed. Here again featurization rules 207 may be loaded from a classification model configuration file 210. In addition, learning parameters and specifications 213B may be loaded into a classifier 220B, which classifier includes a learning component.

The featurized data 223 is also loaded into classifier 220B, from which new or uploaded site/speaker classification models 310 may be derived.

Figure 5:
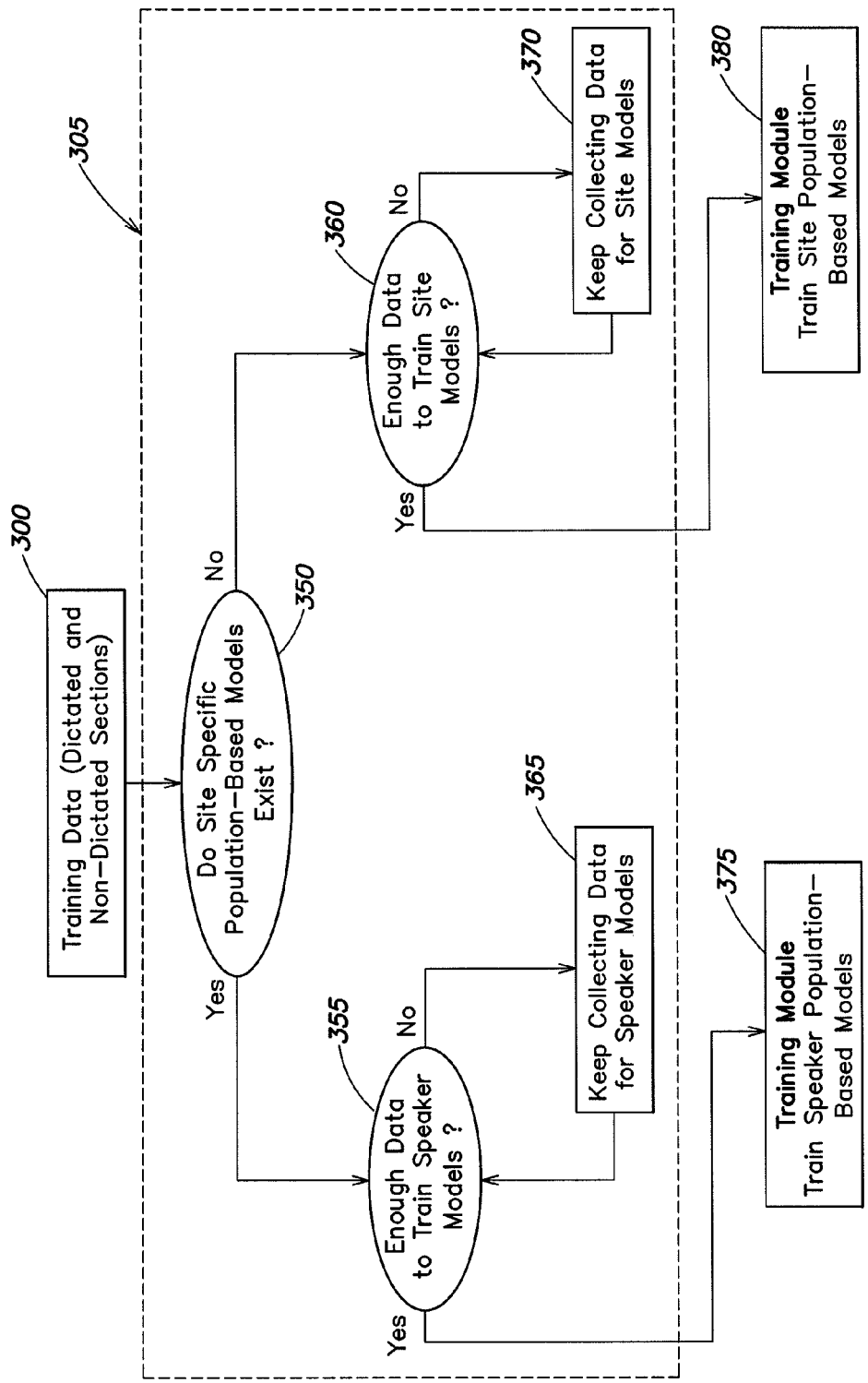
FIG. 5 is a diagram of a data evaluation module according to one embodiment of the invention.

Referring now to FIG. 5, there is shown a diagram representative of a data evaluation module according to one embodiment of the invention. Training data 300 is input into data evaluation module represented in FIG. 5 by box 305. The system determines whether the population-based models exist 350. If site-specific population-based models are determined to exist, system 10 then determines whether there is enough data to train speaker-specific non-dictated section classification models 355. If enough data exists, training data 300 is loaded directly to a training module 375 containing training speaker-specific population-based training models. In the event there is not enough data to train speaker models, system 10 continues to collect data for speaker models 365 until enough data is gathered.

In the event site-specific population-based models do not exist, the system determines whether there exists enough data to train site models 360. If there exists enough data to train the site models, training data 300 is directed to a training module 380 containing training site population-based models. In the event there is not enough data to train site models, system 10 continues to collect data for site models 370 until enough data is gathered.

Training module 375 trains non-dictated section classification models for each speaker based on data from particular speakers where training module 380 is a site population-based training module. If enough data does not exist for a particular speaker, a site-specific non-dictated section classification model is used.

It will be apparent to one of skill in the art that described herein is a novel system and method for automatic document section filtering. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A method for filtering dictated and non-dictated sections of documents, the method comprising steps of:
   gathering speech recognition output and a first set of corresponding documents;
   conforming at least one associated document from the first set of corresponding documents to a selected speech recognition format;
   comparing the speech recognition output and the at least one associated document;
   determining, using a processing unit, long homogeneous sequences of misaligned tokens from the speech recognition output and the at least one associated document;

detecting boundaries between dictated and non-dictated sections in the at least one associated document; and
annotating the at least one associated document with the boundaries.

2. The method according to claim 1, wherein the conforming step further comprises pre-processing the at least one associated document.

3. The method according to claim 1, wherein the comparing step further comprises performing label smoothing on the speech recognition output and the at least one associated document.

4. The method according to claim 3, wherein the label smoothing is performed using a sliding average.

5. The method according to claim 4, wherein the label smoothing is performed using a window size of 3.

6. The method according to claim 1, wherein the determining long homogeneous sequences of misaligned tokens comprises detecting formatting anchors.

7. The method according to claim 1, wherein the detecting step further comprises identifying end points of the determined long homogeneous sequences of misaligned tokens.

8. The method according to claim 1, further comprising outputting the dictated sections to at least one automatic speech recognition process.

9. The method according to claim 8, wherein the at least one automatic speech recognition process is selected from the group consisting of language model identification, language model adaptation, acoustic model adaptation, automatic error correction, and speaker evaluation.

10. The method according to claim 1, further comprising creating classification models in order to distinguish between dictated and non-dictated sections of text in the at least one associated document.

11. The method according to claim 10, further comprising, based on the classification models, categorizing text of a second set of documents to identify dictated and non-dictated sections of text within at least one document from the second set of documents.

12. The method according to claim 11, further comprising outputting dictated sections of the at least one document from the second set of documents to an automatic speech recognition process.

13. The method according to claim 12, wherein the first set of documents does not equal the second set of documents.

14. The method according to claim 1, wherein determining long homogeneous sequences of misaligned tokens comprises:
based on the comparing, labeling at least some tokens in the at least one associated document as misaligned tokens; and
identifying sequences of a predetermined number or more of consecutive tokens in the at least one associated document that are labeled as misaligned tokens as the long homogeneous sequences of misaligned tokens.

15. A system for filtering dictated and non-dictated sections of electronic documents to determine dictated and non-dictated text in the documents, the system comprising:
a central processing unit;
a computer code operatively associated with the central processing unit, the computer code including:
a first set of instructions configured to gather speech recognition output and a first set of documents corresponding to the speech recognition output;
a second set of instructions configured to conform at least one associated document from the first set of corresponding documents to a selected speech recognition format;
a third set of instructions configured to compare the speech recognition output and the at least one associated document;
a fourth set of instructions configured to determine long homogeneous sequences of misaligned tokens from the speech recognition output and the at least one associated document;
a fifth set of instructions configured to detect boundaries between dictated and non-dictated sections in the at least one associated document; and
a sixth set of instructions configured to annotate the at least one associated document with the boundaries.

16. The system according to claim 15, wherein the second set of instructions further comprises instructions to pre-process the at least one associated document.

17. The system according to claim 15, wherein the third set of instructions further comprises instructions to perform label smoothing on the speech recognition output and the at least one associated document.

18. The system according to claim 17, wherein the label smoothing is performed using a sliding average.

19. The system according to claim 18, wherein the label smoothing is performed using a window size of 3.

20. The system according to claim 15, wherein the fourth set of instructions further comprises instructions to detect formatting anchors.

21. The system according to claim 15, wherein the fifth set of instructions further comprises instructions to identify end points of the determined long homogeneous sequences of misaligned tokens.

22. The system according to claim 15, wherein the computer code further includes a seventh set of instructions configured to output the dictated sections to at least one automatic speech recognition process.

23. The system according to claim 22, wherein the at least one automatic speech recognition process is selected from the group consisting of language model identification, language model adaptation, acoustic model adaptation, smart rewrite and speaker evaluation.

24. The system according to claim 15, wherein the computer code includes an eighth set of instructions configured to create classification models in order to distinguish between dictated and non-dictated sections of text in the at least one associated document.

25. The system according to claim 24, wherein the computer code includes a ninth set of instructions configured to, based on the classification models, categorize text of a second set of documents to identify dictated and non-dictated sections of text within at least one document from the second set of documents.

26. The system according to claim 25, wherein the computer code includes a tenth set of instructions configured to output dictated sections of the at least one document from the second set of documents to an automatic speech recognition process.

27. The system according to claim 26, wherein the first set of documents does not equal the second set of documents.

28. The system according to claim 15, wherein the fourth set of instructions comprises instructions to:
based on the comparing, label at least some tokens in the at least one associated document as misaligned tokens; and
identify sequences of a predetermined number or more of consecutive tokens in the at least one associated document that are labeled as misaligned tokens as the long homogeneous sequences of misaligned tokens.

29. A method for identifying dictated and non-dictated sections of at least one document, the method comprising:

comparing, using a processing unit, speech recognition output and at least one associated document to label at least some tokens in the at least one associated document as misaligned tokens;

identifying at least one sequence of a predetermined number or more of consecutive tokens in the at least one associated document that are labeled as misaligned tokens;

based at least in part on the at least one identified sequence, identifying at least one boundary between at least one dictated section and at least one non-dictated section in the at least one associated document; and annotating the at least one associated document with the at least one boundary.

30. A system for identifying dictated and non-dictated sections of at least one document, the system comprising:

a central processing unit; and a computer code operatively associated with the central processing unit, the computer code including instructions to cause the central processing unit to:

compare speech recognition output and at least one associated document to label at least some tokens in the at least one associated document as misaligned tokens;

identify at least one sequence of a predetermined number or more of consecutive tokens in the at least one associated document that are labeled as misaligned tokens;

based at least in part on the at least one identified sequence, identify at least one boundary between at least one dictated section and at least one non-dictated section in the at least one associated document; and annotate the at least one associated document with the at least one boundary.

\* \* \* \* \*